US012693002B1

(12) United States Patent
D'Ascanio et al.

(10) Patent No.: US 12,693,002 B1
(45) Date of Patent: Jul. 28, 2026

(54) LIGHT ADJUSTABLE LIGHTING FIXTURE

(71) Applicants: Franco L D'Ascanio, Key Colony Beach, FL (US); Sean P Snowden, Marathon, FL (US); Harold Zimmermann, Riverton, NJ (US)

(72) Inventors: Franco L D'Ascanio, Key Colony Beach, FL (US); Sean P Snowden, Marathon, FL (US); Harold Zimmermann, Riverton, NJ (US)

(73) Assignee: COASTAL SOURCE, LLC, Marathon, FL (US)

( * ) Notice: Subject to any disclaimer, the term of this patent is extended or adjusted under 35 U.S.C. 154(b) by 0 days.

(21) Appl. No.: 18/911,384

(22) Filed: Oct. 10, 2024

(51) Int. Cl.

| | |
|---|---|
| ***F21V 14/08*** | (2006.01) |
| ***F21S 6/00*** | (2006.01) |
| ***F21V 23/00*** | (2015.01) |
| ***F21V 23/06*** | (2006.01) |
| *F21Y 115/10* | (2016.01) |

(52) U.S. Cl.
CPC .............. *F21V 14/08* (2013.01); *F21S 6/004* (2013.01); *F21V 23/001* (2013.01); *F21V 23/06* (2013.01); *F21Y 2115/10* (2016.08)

(58) Field of Classification Search
CPC ........ F21V 14/08; F21V 23/001; F21V 23/06; F21S 6/004; F21Y 2115/10
See application file for complete search history.

(56) References Cited

U.S. PATENT DOCUMENTS

| | | | | |
|---|---|---|---|---|
| 5,055,987 | A * | 10/1991 | Ellson | F21V 14/04 362/322 |
| 6,402,337 | B1 * | 6/2002 | LeVasseur | F21V 21/06 362/153.1 |
| 9,927,077 | B1 * | 3/2018 | Fowkes | H01M 12/06 |
| 11,221,116 | B1 * | 1/2022 | Barber | F21S 8/083 |
| 11,402,079 | B1 * | 8/2022 | Bucher | F21S 8/081 |
| 12,129,987 | B1 * | 10/2024 | D'Ascanio | F21V 14/08 |
| 2020/0063951 | A1 * | 2/2020 | Yu | H05B 45/10 |

* cited by examiner

*Primary Examiner* — Evan P Dzierzynski
(74) *Attorney, Agent, or Firm* — Stuart M Goldstein

(57) ABSTRACT

An electrical lighting fixture has a light source, like an LED module, located at the top end of the fixture and a light shroud attached to the LED module. The shroud has a stationary base member fixed to the LED module and a movable member overlaying the base member. Both the base member and movable member have side openings. The movable member is rotatably adjustable around the base member to control the size of the openings and therefore the amount of light radiating from the LED module. A vertically adjustable member circumscribes the movable member and can be moved vertically along the surface of the movable member to control the vertical direction of light radiating from the LED module.

10 Claims, 5 Drawing Sheets

LIGHT ADJUSTABLE LIGHTING FIXTURE

FIELD OF THE INVENTION

This invention relates to electrical lighting fixtures, including decorative, landscape, and other types of lighting fixtures which can adjust the direction of illuminating light and can control the amount of light radiating from the fixture.

BACKGROUND OF THE INVENTION

Both outdoor and indoor lighting fixtures are designed to illuminate and often enhance the appearance of exterior and interior spaces. These fixtures are intended to have a specific illuminating effect. Although such fixtures are generally successful in fulfilling this purpose, most are not flexible or adjustable in controlling the amount of illumination, the direction of the lighting, or both the amount and direction.

SUMMARY OF THE INVENTION

It is thus the object of the present invention to provide a lighting fixture which is easily and readily adjustable, both in controlling the direction and the amount of lighting radiating from the fixture, in order to produce a variety of lighting effects.

These and other objects are accomplished by the present invention, an electrical lighting fixture having a light source, such as an LED module, located at the top end of the fixture and a light shroud attached to the light source. The shroud has a stationary base member fixed to the light source and a movable member overlaying the base member. Both the base member and movable member have side openings. The movable member is rotatably adjustable around the base member to control the size of the openings and therefore the amount of light radiating from the light source. A vertically adjustable member circumscribes the movable member and can be moved vertically along the surface of the movable member to control the vertical direction of light radiating from the light source.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
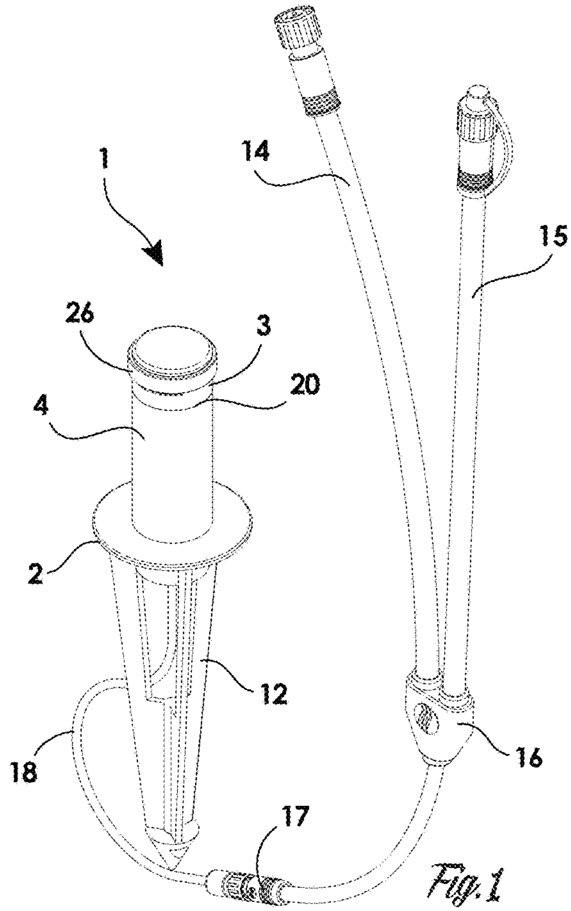
FIG. 1 is a perspective view of the lighting fixture of the present invention.
Figure 2:
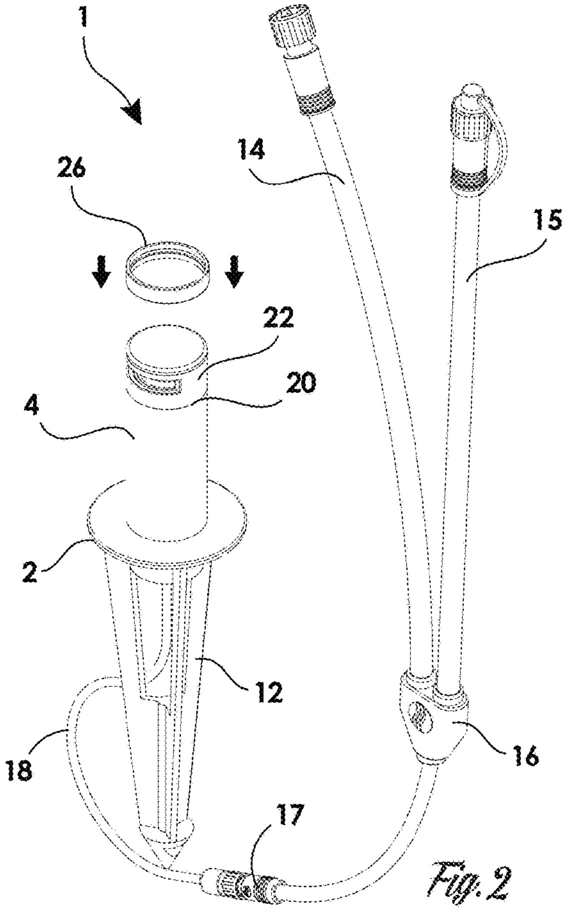
FIG. 2 is a perspective view of the lighting fixture of the present invention with vertically adjustable member removed from the fixture.
Figure 3:
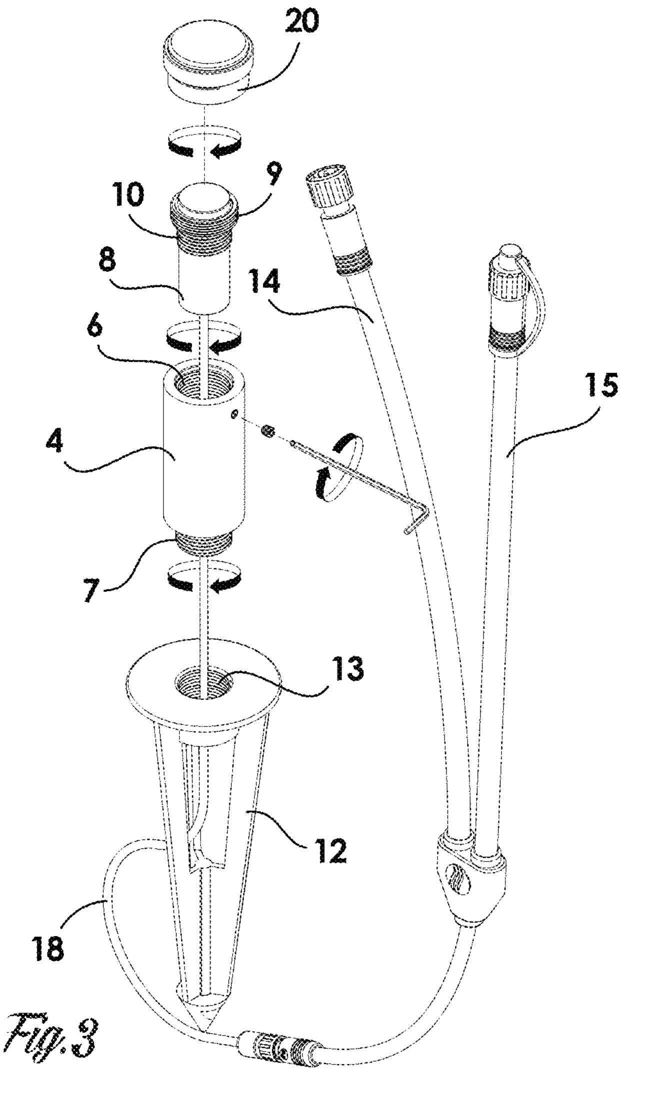
FIG. 3 is an exploded view of the components of the lighting fixture of the present invention.
Figure 4:
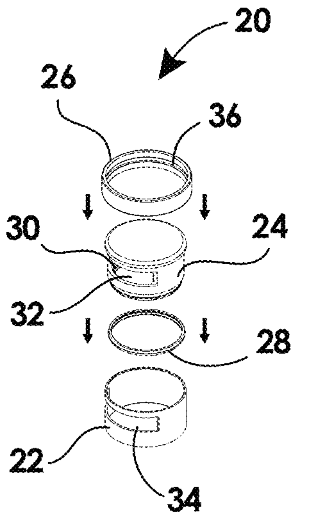
FIG. 4 is an exploded view of the components of the light shroud of the lighting fixture of the present invention.
Figure 5:
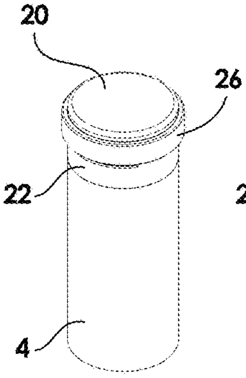
FIGS. 5-9 illustrates the manner of operation of the light shroud in controlling the amount of lighting radiating from the lighting fixture of the present invention.

Electrical lighting fixture 1 comprises elongated lighting fixture body 2 having a top end 3. Riser 4 with female threads 6 and male threads 7, extends down from top end 3. A light source, e.g. LED module 8, has male threads 10 and provides the radiating illuminating lighting from lighting fixture 1. LED module 8 is housed within riser 4 and secured therein by the engagement of threads 6 and 10. Tip stake 12 of lighting fixture 1 is threadably attached to riser 4 of the lighting fixture by riser threads 7 and stake threads 13. Electric cables 14 and 15 are attached to electrical connectors 16 and 17, which in turn connect to wiring 18 which extends through stake 12, riser 4, and into LED module 8 to provide electricity to illuminate the module.

Light shroud or light trim unit 20 comprises circularly shaped movable member 22, circularly shaped stationary base member 24, ring shaped vertically adjustable member 26, and ring shaped "O" ring 28.

Base member 24 comprises male threads 30 which threadably engage female threads 9 around LED module 8. Opening 32 extends through the side wall of base member 24.

Movable member 22 comprises opening 34 extending through its side wall. The inside diameter of movable member 22 is slightly longer than the inside diameter of base member 24, such that the movable member overlays the base member.

Figure 6:
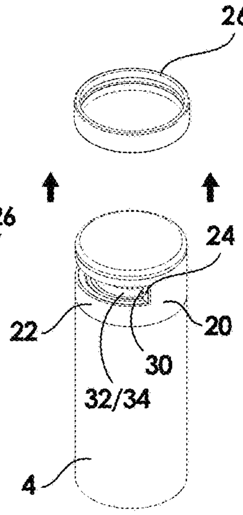
Figure 7:
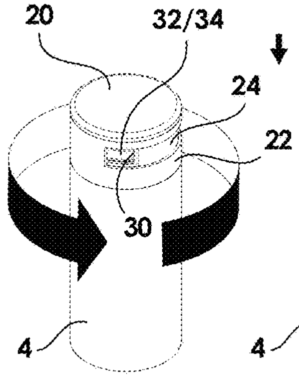
Figure 8:
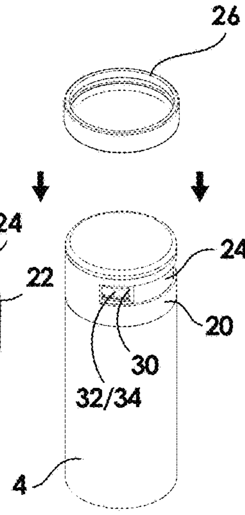
Figure 9:
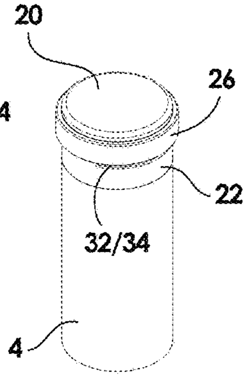
Figure 10:
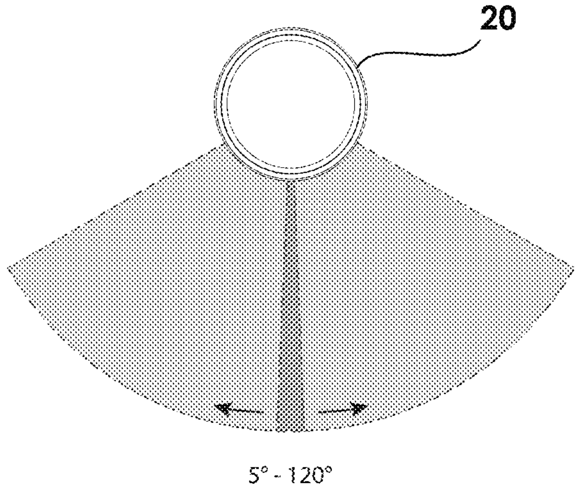
FIG. 10 illustrates the angular range of radiating horizontal illumination of the lighting fixture of the present invention.

Opening 34 of movable member 22 can be positioned over opening 32 of base member 24 so as to totally cover opening 32. However, as illustrated in FIGS. 6-8, as movable member 22 is rotated about base member 24, the size of opening 32 of the base member and the size of opening 34 of the movable member increases as the openings are uncovered. It is therefore evident that the sizes of openings 32 and 34, as is dictated by the degree of rotation of movable member 22, control the amount of illuminating light radiating laterally outward, horizontally from and in relation to LED module 8. FIG. 10 illustrates the wide range of angles light can be directed by the rotation of movable member 22 and around base member 24.

Figure 11:
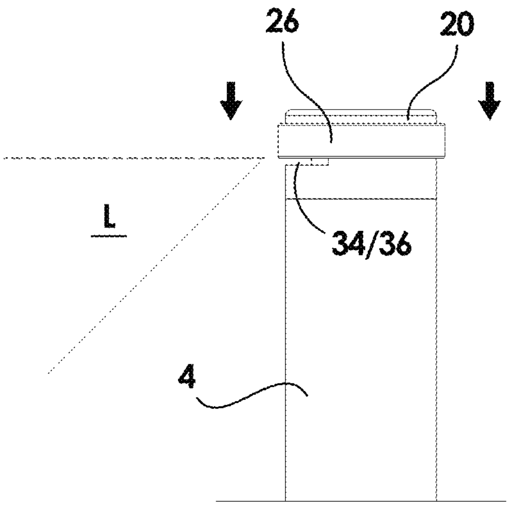
FIGS. 11 and 12 illustrate the matter of operation of the light shroud in controlling the vertical direction of illumination radiating from the lighting fixture of the present invention.
Figure 12:
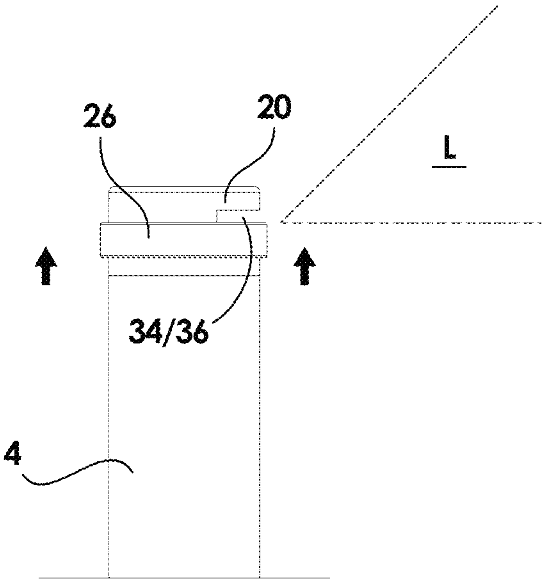

Vertically adjustable member 26 has an inside diameter which is slightly larger than the outside diameter of movable member 22. It is thus free to be raised and lowered vertically along the surface of movable member 22. As a result, when vertically adjustable member 26 is in its raised position, and with light from module 8 radiating out of openings 32 and 34, light L is directed downward, as is best seen in FIG. 11. When vertically adjustable member 26 is in a lowered position, and with light radiating out of openings 32 and 34, light L is directed upward, as is best seen in FIG. 12.

Vertically adjustable member 26 has an internal rubber type grommet 36. This ensures that regardless of the vertical location member 26 is placed along movable member 22, it is snug against the surface of the movable member and remains at this location.

Although the adjustable light fixture of the present invention is described in use herein as a landscape lighting fixture, it should not be considered solely for this purpose. It is contemplated that the present invention, and particularly its unique light shroud or light trim unit, can be utilized for any lighting fixture in order to control the direction and amount of illuminating light radiating from the fixture.

It is thus evident that the lighting fixture of the present invention has the versatility to crop illuminating light both vertically and horizontally to produce custom tailored and directional light radiating from the fixture. The light adjustment technique provided by the invention eliminates glare and enables the installer to highlight the objects he or she wishes to feature without spill light, which has challenged even the most experienced lighting designers.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. An electrical lighting fixture comprising:

an elongated lighting fixture body having a top end;

a light source providing illuminating lighting from the lighting fixture, said light source being located at the top end of the lighting fixture body; and a light shroud attached to the light source, said light shroud comprising a stationary base member affixed to the light source, said base member having at least one opening through which illuminating light from the light source radiates, and a movable member circumscribing and overlaying the base member, the movable member having an opening through which illuminating light from the light source radiates, the movable member being adjustable from a position in which it totally covers the opening of the base member, to positions in which it partially covers the opening of the base member, thereby controlling the size of the opening of the base member, the light shroud being adjustable in relation to the light source in order to vary the direction and amount of illuminating light radiating from the light source.

2. The electrical lighting fixture as in claim 1 wherein the movable member is adjustably rotatable around the base member to control the size of the opening of the base member in order to control the amount of illuminating light radiating laterally and horizontally outward from the light source through both the openings.

3. The electrical lighting fixture as in claim 2 further comprising a vertically adjustable member circumscribing the movable member, wherein the position of the vertically adjustable member along the surface of the movable member controls the vertical direction of the illuminating light radiating from the light source.

4. The electrical lighting fixture as in claim 1 further comprising a vertically adjustable member circumscribing the movable member, wherein the position of the vertically adjustable member along the surface of the movable member controls the vertical direction of the illuminating light radiating from the light source.

5. The electrical lighting fixture as in claim 1 wherein the light source is an LED module.

6. An electrical lighting fixture comprising:

an elongated lighting fixture body having a top end;

a light source providing illuminating light from the lighting fixture, said light source being affixed to the top end of the lighting fixture body; and a light trim unit attached to the light source, said light trim unit having dual side openings through which illuminating light from the light source radiates, the light trim unit being adjustable in relation to the light source in order to vary the direction and amount of illuminating light radiating from the light source.

7. The electrical lighting fixture as in claim 6 further comprising a vertically adjustable member circumscribing the light trim unit, wherein the position of the vertically adjustable member along the surface of the light trim unit controls the vertical direction of the illuminating light radiating from the light source.

8. The electrical lighting fixture as in claim 6 wherein the light source is an LED module.

9. An electrical lighting fixture comprising:

an elongated lighting fixture body having a top end;

a light source providing illuminating lighting from the lighting fixture, said light source being located at the top end of the lighting fixture body;

a light shroud attached to the light source, said light shroud having at least one opening through which illuminating light from the light source radiates, the light shroud being adjustable in relation to the light source in order to vary the direction and amount of illuminating light radiating from the light source; and a vertically adjustable member circumscribing the light shroud, wherein the position of the vertically adjustable member along the surface of the light shroud controls the vertical direction of the illuminating light radiating from the light source.

10. The electrical lighting fixture as in claim 9 wherein the light source is an LED module.

* * * * *